United States Patent
Yuan et al.

(10) Patent No.: US 9,930,723 B2
(45) Date of Patent: Mar. 27, 2018

(54) ANR TASK EXECUTION METHOD, SYSTEM AND ANR USER EQUIPMENT MANAGEMENT METHOD, APPARATUS

(71) Applicant: ZTE Corporation, Shenzhen, Guangdong (CN)

(72) Inventors: Qiuhong Yuan, Shenzhen (CN); Zhongying Xia, Shenzhen (CN); Qingyuan Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 121 days.

(21) Appl. No.: 14/652,278

(22) PCT Filed: Oct. 10, 2013

(86) PCT No.: PCT/CN2013/084980
§ 371 (c)(1),
(2) Date: Jun. 15, 2015

(87) PCT Pub. No.: WO2014/090030
PCT Pub. Date: Jun. 19, 2014

(65) Prior Publication Data
US 2015/0351152 A1    Dec. 3, 2015

(30) Foreign Application Priority Data
Dec. 13, 2012   (CN) .......................... 2012 1 0538657

(51) Int. Cl.
*H04W 76/04*   (2009.01)
*H04W 52/02*   (2009.01)
(Continued)

(52) U.S. Cl.
CPC ......... *H04W 76/048* (2013.01); *H04W 24/02* (2013.01); *H04W 52/0216* (2013.01); *H04W 88/02* (2013.01); *Y02B 60/50* (2013.01)

(58) Field of Classification Search
CPC ............... H04W 76/048; H04W 24/02; H04W 52/0216; H04W 88/02
See application file for complete search history.

(56) References Cited

U.S. PATENT DOCUMENTS

| | | | |
|---|---|---|---|
| 7,965,651 B2* | 6/2011 | Du | H04W 76/048 370/252 |
| 2012/0051274 A1* | 3/2012 | Song | H04W 48/10 370/311 |

FOREIGN PATENT DOCUMENTS

| | | |
|---|---|---|
| CN | 101778369 A | 7/2010 |
| CN | 101790212 A | 7/2010 |

(Continued)

OTHER PUBLICATIONS

Supplementary European Search Report in European application No. 13861827.7, dated Dec. 7, 2015.
(Continued)

Primary Examiner — Ian N Moore
Assistant Examiner — Latresa McCallum
(74) Attorney, Agent, or Firm — Oppedahl Patent Law Firm LLC (57) ABSTRACT

An Automatic Neighbor Relation (ANR) task execution method, system and an ANR user equipment management method, apparatus are described, when an ANR function is enabled, a corresponding User Equipment (UE) is selected for the enabled ANR function, and then a Discontinuous Reception (DRX) configuration matching this ANR function is configured for the selected UE; that is, the disclosure specifically configures a matching DRX parameter for the UE selected by the ANR function, without searching a required UE from the UE configuring a Long DRX in an entire cell, thus improving efficiency and a success rate of executing an ANR task; simultaneously the disclosure only needs to perform specific configuration on the UE selected
(Continued)

by the ANR function, without changing the configuration of all the UEs in the entire cell, thus greatly reducing an influence on a Key Performance Indicator (KPI) of the cell, and improving entire user experience satisfaction of the cell.

10 Claims, 4 Drawing Sheets

(51) Int. Cl.
*H04W 24/02* (2009.01)
*H04W 88/02* (2009.01)

(56) References Cited

FOREIGN PATENT DOCUMENTS

| CN | 102348215 A | 2/2012 |
| CN | 102378249 A | 3/2012 |
| CN | 102761890 A | 10/2012 |
| CN | 102761897 A | 10/2012 |
| EP | 2429243 A1 | 3/2012 |
| JP | 2012526420 A | 10/2012 |

OTHER PUBLICATIONS

CGI Measurement During DRX, 3GPP Draft; R2-082932 CGI MEAS , 3rd Generation Partnership Project (3GPP) , Mobile Competence Centre,vol. RAN WG2 , no. Sophia Antipolis , mailed on Jun. 1, 2008.

UE support for SON Automatic Neighbour Relation Function,3GPP Draft; R4-080277 ,3rd Generation Partnership Project (3GPP) , Mobile Competence Centre,vol. RAN WG4 , no. Sorrento , Italy; mailed on Feb. 5, 2008.

International Search Report in international application No. PCT/CN2013/084980, dated Jan. 16, 2014.

English Translation of the Written Opinion of the International Search Authority in international application No. PCT/CN2013/084980, dated Jan. 16, 2014.

* cited by examiner

ANR TASK EXECUTION METHOD, SYSTEM AND ANR USER EQUIPMENT MANAGEMENT METHOD, APPARATUS

TECHNICAL FIELD

The disclosure relates to the field of communications, and specifically relates to an Automatic Neighbor Relation (ANR) task execution method, system and an ANR user equipment management method, apparatus.

BACKGROUND

In a Long Term Evolution (LTE) project system of a 3rd Generation Partnership Project (3GPP), Discontinuous Reception (DRX) is introduced under a Radio Resource Control (RRC) connection state. The DRX is referred to discontinuously receiving downlink scheduling and downlink data by a terminal, when the terminal does not need to receive the downlink data, the terminal may be in a sleep state, and a radio frequency unit and even other processing units of the terminal may not work, so as to achieve a purpose of power saving.

The ANR is one of key techniques for a Self-Organizing Network (SON) function, and can implement self-configuring and self-organizing of a neighbor relation, so as to alleviate working intensity of network planning and network organizing staff, thus reducing networking investment and an operating cost. The related art regulates that a User Equipment (UE) having a capability of ANR measurement must have a Long DRX ability, and can only perform the ANR measurement in the sleep state of the DRX when the DRX is configured for the UE. Because a maximum time delay of 9 kinds of currently formalized Quality of Service (QoS) Class Identifiers (QCIs) is required to be 300 ms, while an inter-system ANR requires a DRX cycle to be configured to be more than 1000 ms, so as to be able to complete a requirement that a Cell Global Identifier (CGI) of an inter-system neighbor area can be measured, the UE meeting this condition may not be searched if searching in accordance with the condition, and a long time is needed to be expended for searching the UE meeting the condition, and both execution efficiency and a success rate are low. In addition, if the DRX cycle configured for all the UEs in a cell is configured to be greater than 1000 ms, then satisfaction of QoS of the UE is bad, and a Key Performance Indicator (KPI) index of the cell may be influenced.

SUMMARY

A main technical problem to be solved by an embodiment of the disclosure is to provide an ANR task execution method, system and an ANR user equipment management method, apparatus, so as to solve a problem that execution efficiency and a success rate of an existing ANR task are low, and entire user experience satisfaction of a cell is low.

In order to solve the above technical problem, an embodiment of the disclosure provides an ANR task execution method, which includes:

selecting a corresponding user equipment, when an ANR function is enabled;

configuring a discontinuous reception configuration matching the ANR function for the user equipment; and executing a corresponding ANR task based on the discontinuous reception configuration.

In an embodiment of the disclosure, the configuring the discontinuous reception configuration matching the ANR function for the user equipment may include:

when the ANR function is an intra-system ANR function, then configuring an DRX parameter supporting the intra-system ANR function for the user equipment; and when the ANR function is an inter-system ANR function, then configuring an DRX parameter supporting the inter-system ANR function for the user equipment.

In an embodiment of the disclosure, the configuring the discontinuous reception configuration matching the ANR function for the user equipment may further include:

after the DRX parameter supporting the ANR function has been configured for the user equipment, setting a state of the user equipment as being selected by the ANR function.

In an embodiment of the disclosure, the configuring the discontinuous reception configuration matching the ANR function for the user equipment may further include:

after the DRX parameter supporting the ANR function has been configured for the user equipment, starting a corresponding timer in correspondence with the ANR task.

In an embodiment of the disclosure, the executing the corresponding ANR task based on the discontinuous reception configuration may include:

judging whether execution of the ANR task is finished or the timer is overtime, when the execution is finished or the timer is overtime, then performing a discontinuous reception configuration removing operation on the user equipment.

In an embodiment of the disclosure, the executing the corresponding ANR task based on the discontinuous reception configuration may further include:

judging whether the user equipment initiates a discontinuous reception configuration release request, when the user equipment initiates the discontinuous reception configuration release request, then performing a discontinuous reception configuration release operation on the user equipment; or judging whether the user equipment initiates a discontinuous reception configuration modifying request, when the user equipment initiates the discontinuous reception configuration modifying request, then judging whether the user equipment is suitable for configure the discontinuous reception configuration based on a service, when the user equipment is suitable, then re-configuring the discontinuous reception configuration for the user equipment, when the user equipment is not suitable, then releasing the discontinuous reception configuration.

In order to solve the above technical problem, an embodiment of the disclosure further provides an ANR user equipment management method, which includes:

selecting a corresponding user equipment when an ANR function is enabled; and configuring a discontinuous reception configuration matching the ANR function for the user equipment.

In an embodiment of the disclosure, the configuring the discontinuous reception configuration matching the ANR function for the user equipment may include:

when the ANR function is an intra-system ANR function, then configuring a DRX parameter supporting the intra-system ANR function for the user equipment; and when the ANR function is an inter-system ANR function, then configuring the DRX parameter supporting the inter-system ANR function for the user equipment.

In an embodiment of the disclosure, the configuring the discontinuous reception configuration matching the ANR function for the user equipment may further include:

after the DRX parameter supporting the ANR function has been configured for the user equipment, setting a state of the user equipment as being selected by the ANR function.

In an embodiment of the disclosure, the configuring the discontinuous reception configuration matching the ANR function for the user equipment may further include:

after the DRX parameter supporting the ANR function has been configured for the user equipment, starting a corresponding timer in correspondence with the ANR task.

In an embodiment of the disclosure, the ANR user equipment management method may further include: after the configuring the discontinuous reception configuration matching the ANR function for the user equipment, judging whether execution of the ANR task is finished or the timer is overtime, when the execution is finished or the timer is overtime, then performing a discontinuous reception configuration removing operation on the user equipment.

In order to solve the above problem, an embodiment of the disclosure further provides an ANR user equipment management apparatus, which includes:

a user equipment selection module, configured to select a corresponding user equipment when an ANR function is enabled; and a discontinuous reception configuration module, configured to configure discontinuous reception configuration matching the ANR function for the user equipment selected by the user equipment selection module.

In an embodiment of the disclosure, the discontinuous reception configuration module may include a judgment sub-module and a configuration sub-module, wherein the judgment sub-module is configured to judge whether the ANR function is an intra-system ANR function or an inter-system ANR function, and to send a judgment result to the configuration sub-module; and the configuration sub-module is configured to configure a DRX parameter supporting the intra-system ANR function for the user equipment when the judgment result is the intra-system ANR function; and to configure the DRX parameter supporting the inter-system ANR function for the user equipment when the judgment result is the inter-system ANR function.

In an embodiment of the disclosure, the discontinuous reception configuration module may further include a timer starting sub-module;

the timer starting sub-module is configured to start a timer corresponding to the ANR task, after the configuration sub-module has configured the DRX parameter supporting the ANR function for the user equipment.

In order to solve the above technical problem, an embodiment of the disclosure further provides an ANR task execution system, which includes: an ANR user equipment management apparatus, and at least one user equipment; wherein the ANR user equipment management apparatus may include a user equipment selection module and a discontinuous reception configuration module; wherein the user equipment selection module is configured to select a corresponding user equipment from at least one user equipment when an ANR function is enabled;

the discontinuous reception configuration module is configured to configure discontinuous reception configuration matching the ANR function for the user equipment selected by the user equipment selection module; and the user equipment selected by the user equipment selection module is configured to execute a corresponding ANR task based on the discontinuous reception configuration.

An advantage of the embodiment of the disclosure is:

The ANR task execution method, system and the ANR user equipment management method, apparatus, which are provided by the embodiments of the disclosure, select the corresponding user equipment for the enabled ANR function when the ANR function is enabled, and then configure the DRX configuration matching this ANR function for the selected user equipment; that is the embodiment of the disclosure specifically configures the matching DRX parameter for the UE selected by the ANR function, without searching the required UE from the UE of an entire cell, and therefore the execution efficiency and the success rate of the ANR task may be improved; simultaneously the embodiment of the disclosure only needs to perform specific configuration on the UE selected by the ANR function, and does not change the configurations of all the UEs in the entire cell, therefore an influence on a KPI of the cell may be greatly reduced, and entire user experience satisfaction of the cell may be improved.

DETAILED DESCRIPTION

Embodiment 1

Figure 1:
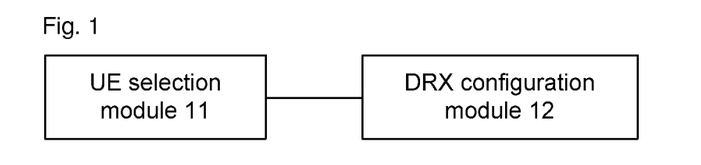
FIG. 1 is a schematic structure diagram of an ANR user equipment management apparatus in Embodiment 1 of the disclosure.

Referring to FIG. 1, an Automatic Neighbor Relation (ANR) user equipment management apparatus, which is provided by this embodiment as an example, includes: a user equipment selection module 11 (namely a UE selection module), and a discontinuous reception configuration module 12 (namely a DRX configuration module), wherein:

the UE selection module 11 is configured to select a corresponding UE when an ANR function is enabled; and the DRX configuration module 12 is configured to configure a DRX configuration matching the ANR function for the UE selected by the UE selection module.

Here, the DRX configuration module may be a Radio Resource Control (RRC) module.

It can be seen that a matching DRX parameter is specifically configured for the UE selected by the ANR function in this embodiment, without searching the UE meeting a DRX requirement from the UE of an entire cell, therefore execution efficiency and a success rate of an ANR task may be improved; simultaneously because it only needs to perform specific configuration on the UE selected by the ANR function, and not to change configurations of all the UEs in the entire cell, therefore an influence on a KPI of the cell may be greatly reduced, and entire user experience satisfaction of the cell may be improved.

In this embodiment, a rule for the UE selection module to select the corresponding UE may be set according to an actual situation. For example, when the enabled ANR function is an intra-system ANR function or an inter-system ANR function, the UE selection module may select the UE in accordance with the following principles:

(1) the UE currently only has a Non-Guaranteed Bit Rate (NGBR) service;

(2) a current state of the UE is a Cell Edge User (CEU) state, that is the UE triggers an A3-Enter event, wherein the A3-Enter event may share a A3 measurement control with measurement determined by a centre area/edge area of an Inter-Cell Interference Coordination (ICIC) technique;

(3) the UE is in a control plane steady state currently; and (4) the UE has a Long DRX ability and an ANR measurement ability.

Figure 2:
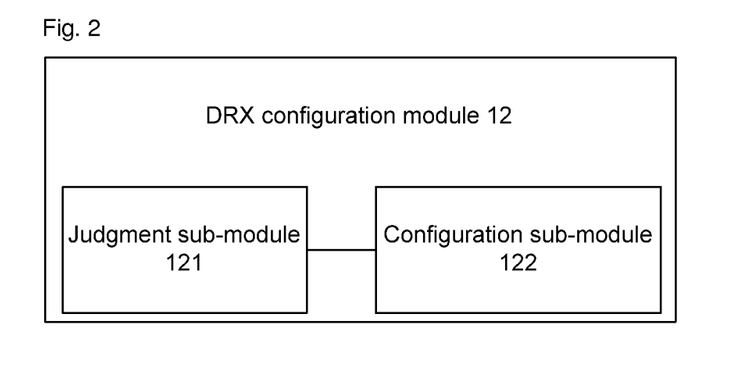
FIG. 2 is a schematic structure diagram of a discontinuous reception configuration module in FIG. 1.

The UE selection module sends a selection result to the DRX configuration module, and then the DRX configuration module configures a corresponding DRX configuration for the selected UE in correspondence with a corresponding ANR function type. Referring to FIG. 2, the DRX configuration module 12 in this embodiment includes a judgment sub-module 121 and a configuration sub-module 122, wherein:

the judgment sub-module 121 is configured to judge whether the enabled ANR function is an intra-system function or an inter-system function, and to send a judgment result to the configuration sub-module;

the configuration sub-module 122 is configured to configure the DRX parameter supporting the intra-system ANR function for the selected UE when the received judgment result is the intra-system ANR function; and to configure the DRX parameter supporting the inter-system ANR function for the selected UE when the received judgment result is the inter-system ANR function.

In this embodiment, the DRX configuration module further includes a timer starting sub-module and a state identifier setting sub-module, wherein:

the timer starting sub-module is configured to start a timer corresponding to this ANR task when the configuration sub-module has configured the DRX parameter supporting the ANR function for the selected UE; for example, when the enabled ANR function is the intra-system ANR function, then the timer corresponding to an intra-system is started; when the enabled ANR function is the inter-system ANR function, then the timer corresponding to an inter-system is started.

The state identifier setting sub-module is configured to set a state of this UE as being selected by the ANR function, after the configuration sub-module has configured the DRX parameter supporting the ANR function for the selected UE.

After experiencing the above configuration, the UE selected by the UE selection module executes a corresponding ANR task based on the above DRX configuration.

Preferably, the ANR user equipment management apparatus in this embodiment may further include a discontinuous reception configuration removing module, configured to judge whether execution of the ANR task is finished or the timer is overtime, if the execution is finished or the timer is overtime, then to perform a DRX configuration removing operation on this UE.

Figure 3:
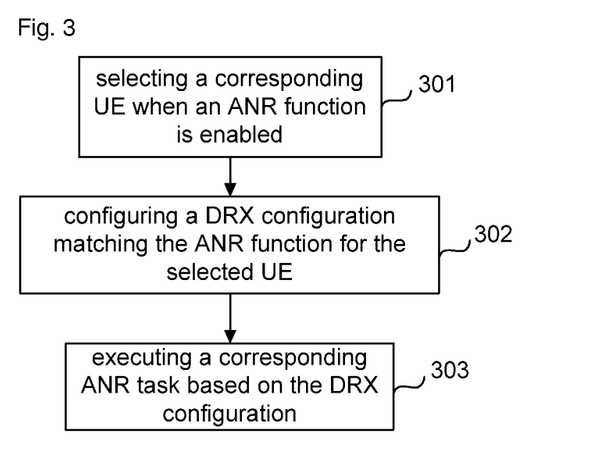
FIG. 3 is a schematic flowchart of executing an ANR task in Embodiment 1 of the disclosure.

In order to understand a technical scheme of the disclosure better, the technical scheme of the disclosure is further explained below in combination with a specific process of executing the ANR task, referring to FIG. 3, which includes:

Step 301: selecting a corresponding UE when an ANR function is enabled;

Step 302: configuring a DRX configuration matching the ANR function for the selected UE; and Step 303: executing a corresponding ANR task based on the DRX configuration.

Wherein, the above principle may be adopted as the principle for selecting the UE in step 301.

Figure 4:
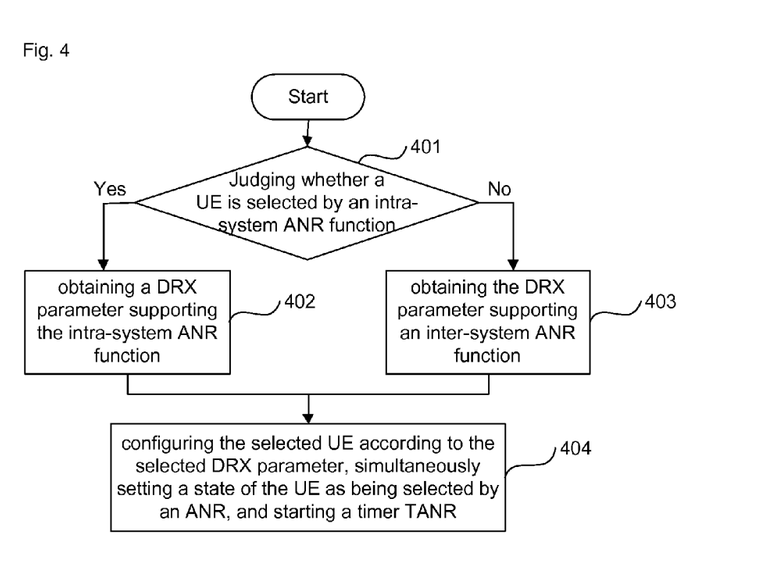
FIG. 4 is a schematic flowchart of configuring a DRX configuration for a UE in FIG. 3.

In step 302, the configuring the DRX configuration matching the ANR function for the selected UE, referring to FIG. 4, may specifically be shown below:

Step 401: judging whether the UE is selected by an intra-system ANR function or an inter-system ANR function, if the UE is selected by the intra-system ANR function, then turning to step 402, if the UE is selected by the inter-system ANR function then turning to step 403;

Step 402: obtaining a DRX parameter supporting the intra-system ANR function, selecting an intra-system corresponding timer as the timer: TANR=TANRintra, and turning to step 404;

Step 403: obtaining the DRX parameter supporting the inter-system ANR function, selecting an inter-system corresponding timer as the timer: TANR=TANRinter, and turning to step 404;

Step 404: configuring the selected UE according to the selected DRX parameter, simultaneously setting a state of the UE as being selected by an ANR, and starting the timer TANR.

Figure 5:
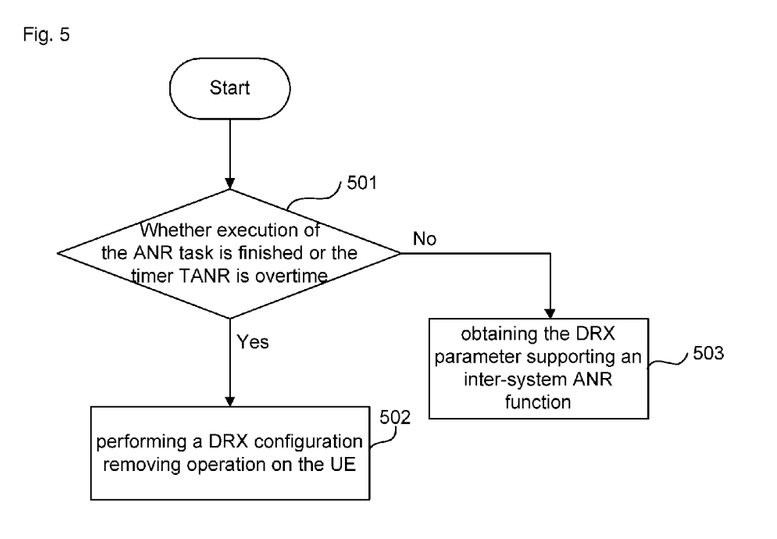
FIG. 5 is a schematic flowchart of executing an ANR task in FIG. 3.

In the above step 303, a procedure of executing the corresponding ANR task based on the configured DRX parameter is referred in FIG. 5, and specifically includes:

Step 501: judging whether execution of the ANR task is finished or the timer TANR is overtime, if the execution is finished or the timer TANR is overtime, then turning to step 502; otherwise, turning to step 503;

Step 502: performing a discontinuous reception configuration removing operation on the UE.

Step 503: executing the ANR task continuously by the UE.

Figure 6:
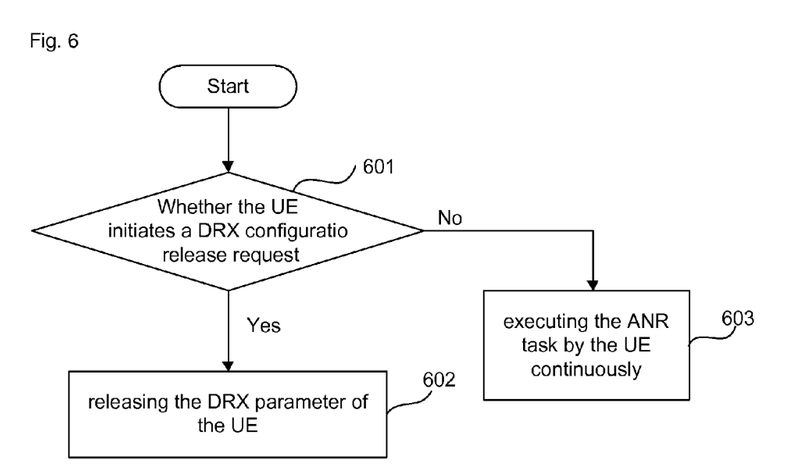
FIG. 6 is a schematic flowchart of releasing a DRX parameter according to a discontinuous reception configuration release request in Embodiment 1 of the disclosure.
Figure 7:
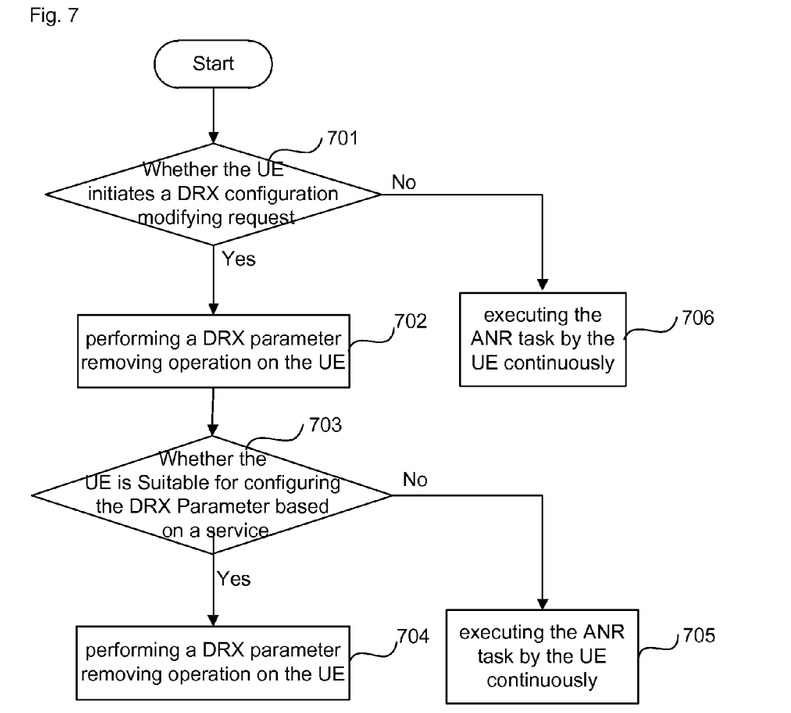
FIG. 7 is a schematic flowchart of configuring a DRX parameter according to a discontinuous reception configuration modifying request in Embodiment 1 of the disclosure.

At the same time, in order to reduce the influence on QoS of the UE executing this task during the procedure of executing the ANR task, in the above step 303, referring to FIGS. 6 and 7, the following steps may further be included:

Referring to FIG. 6:

Step 601: judging whether the UE initiates a discontinuous reception configuration release request, during the procedure of executing the corresponding ANR task based on the configured DRX parameter, if the UE initiates the request, then turning to step 602; otherwise, turning to step 603;

Step 602: releasing the DRX parameter of the UE; and

Step 603: executing the ANR task continuously by the UE.

Referring to FIG. 7:

Step 701: judging whether the UE initiates a discontinuous reception configuration modifying request during the procedure of executing the corresponding ANR task based on the configured DRX parameter, if the UE initiates the request, then turning to step 702; otherwise, turning to step 706;

Step 702: performing a DRX parameter removing operation on the UE;

Step 702: judging whether the user equipment is suitable for configuring the DRX parameter based on a service, if the user equipment is suitable, then turning to step 704; otherwise, turning to step 705;

Step 704: re-configuring the discontinuous reception configuration for the UE.

Step 705: releasing the DRX parameter of the UE.

Step 706: executing the ANR task continuously by the UE.

In this embodiment, after the UE finishes the execution of the ANR task or the timer TANR is overtime, the above steps from step 702 to step 705 may also be directly executed.

Figure 8:
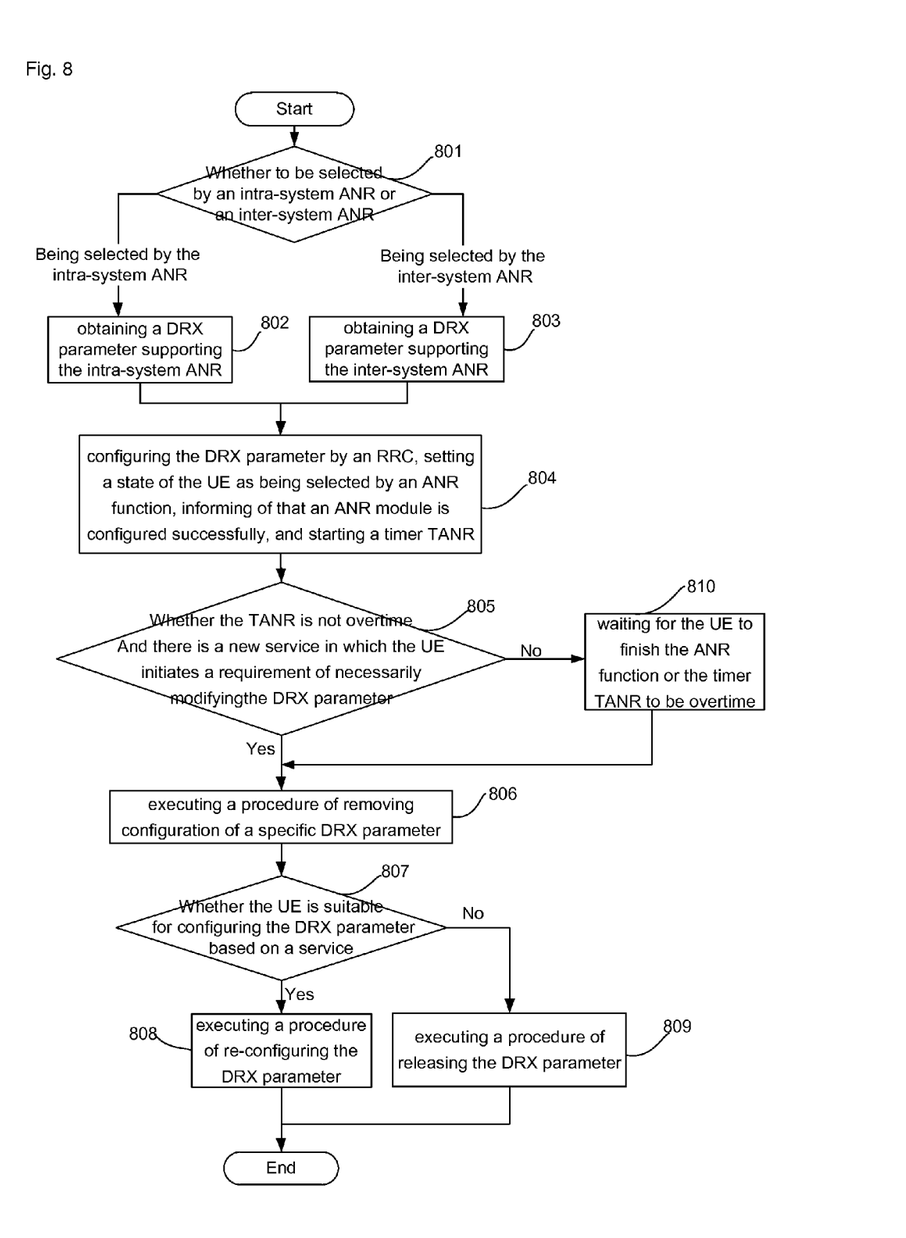
FIG. 8 is another schematic flowchart of executing the ANR task in Embodiment 1 of the disclosure.

An entire flowchart of executing the above ANR task is shown in FIG. 8:

Step 801: judging whether the UE is selected by the intra-system ANR function or is selected by the inter-system ANR function, if the UE is selected by the intra-system ANR function, then turning to step 802, if the UE is selected by the inter-system ANR function, then turning to step 803;

Step 802: obtaining the DRX parameter supporting the intra-system ANR function, selecting the intra-system corresponding timer as the timer: TANR=TANRintra, and turning to step 804;

Step 803: obtaining the DRX parameter supporting the inter-system ANR function, selecting the inter-system corresponding timer as the timer: TANR=TANRinter, and turning to step 804;

Step 804: configuring the selected UE according to the selected DRX parameter, simultaneously setting the state of the UE as being selected by the ANR, and starting the timer TANR;

Step 805: judging whether the UE initiates the discontinuous reception configuration modifying request during the procedure of executing the corresponding ANR task based on the configured DRX parameter, that is TANR is not overtime, if the UE initiates the discontinuous reception configuration modifying request, then turning to step 806; otherwise, turning to step 810;

Step 806: performing the DRX parameter removing operation on the UE;

Step 807: judging whether the user equipment is suitable for configuring the discontinuous reception configuration based on the service, if the use equipment is suitable, then turning to step 808; otherwise, turning to step 809;

Step 808: re-configuring the DRX configuration for the UE.

Step 809: releasing the DRX parameter of the UE.

Step 810: waiting for the UE to finish the ANR task or the TANR to be overtime, and turning to step 806.

It can be seen that this embodiment specifically configures the DRX parameter for the UE selected by the ANR function, influences the fewest UEs, and influences the UE in the least time, that is the success rate of ANR measurement is improved without influencing entire user's feeling of the cell, and simultaneously a KPI index is not influenced; further, the DRX parameter may also be adjusted in time in accordance with the service of the UE, and the influence on the QoS of the UE executing the ANR function is reduced to a lowest extant.

In order to understand the technical scheme of the disclosure better, explanation may be performed below in combination with some specific UE selection procedures and ANR execution procedures which are taken as examples.

Embodiment 2

In an LTE cell, an inter-system ANR switch is turned on, a threshold of an A3-Enter event is set as −3 dB, TANRinter is set as 3 s.

At this time, when a certain UE code-named B reports the A3-Enter event, the UE selection module judges: the UE code-named B currently only has a default bearer service in which QCI=9, that is the UE only has an NGBR service; simultaneously, it is explained that the UE is in a cell edge, and enters the CEU state, because the A3-Enter event is reported; the current UE does not trigger a switching process and etc., and is in a control plane steady state; simultaneously the UE has the Long DRX ability and the ANR measurement ability; therefore, this UE code-named B is selected as a UE specifically used for ANR measurement, and this UE is labelled as being selected by the inter-system ANR function, and is output to the DRX configuration module, this DRX configuration module may be an RRC module, specifically:

Step 21: judging that the UE code-named B is selected by the inter-system ANR function, and turning to step 22;

Step 22: obtaining the DRX parameter supporting an inter-system ANR, setting a DRX cycle as 1280 ms, selecting an inter-system timer as the timer, TANR=TANRinter=3 s, and turning to step 23;

Step 23: configuring the DRX parameter by the RRC module, simultaneously setting the state of the UE as being selected by the ANR, starting the timer TANR, and turning to step 24;

Step 24: when the timer TANR starts for 1 s, finishing the ANR task by the UE, reporting, by a Cell Global Identifier (CGI), that this UE finishes the execution of the ANR task, executing the procedure of removing configuration of a specific DRX parameter, and turning to step 25;

Step 25: judging whether the UE is suitable for configuring the DRX parameter based on the service, not configuring the DRX parameter because a DRX switch of the cell is not turned on, and turning to step 26; and Step 26: when the UE is not suitable for configuring the DRX parameter based on the service, that is, a DRX function module cannot output the DRX parameter, then releasing the DRX parameter.

Embodiment 3

In the LTE cell, an intra-system ANR switch is turned on, the threshold of the A3-Enter event is set as −3 dB, and TANRinter is 1 s.

At this time, a certain UE code-named C reports the A3-Enter event, the UE selection module judges: the UE code-named C currently only has a default bearer service in which QCI=9, that is the UE only has the NGBR service; at the same time, because the A3-Enter event is reported, it is explained that the UE is in the cell edge, and enters the CEU state; the current UE does not trigger the switching process and etc., and is in the control plane steady state; simultaneously it shows that the UE has the Long DRX ability and the ANR measurement ability; therefore, this UE code-named C is selected as the UE specifically used for the ANR measurement, this UE is labelled as being selected by an intra-system ANR, and is output to the DRX configuration module, specifically:

Step 31: judging that the UE code-named C is selected by the intra-system ANR function, and turning to step 32;

Step 32: obtaining the DRX parameter supporting the intra-system ANR, setting the DRX cycle as 320 ms, selecting an intra-system timer as the timer, TANR=TANRintra=1 s, and turning to step 33;

Step 33: configuring the DRX parameter by an RRC, simultaneously setting the state of the UE as being selected by the ANR, starting the timer TANR, and turning to step 34;

Step 34: when the timer TANR starts for 0.5 s, finishing the ANR function by the UE, reporting, by an intra-system CGI, that this UE finishes the execution of the ANR task, executing the procedure of removing the configuration of the specific DRX parameter, and turning to step 35;

Step 35: judging whether the UE is suitable for configuring the DRX parameter based on the service, not configuring the DRX parameter because the DRX switch of the cell is not turned on, and turning to step 36;

Step 36: when the UE is not suitable for configuring the DRX parameter based on the service, that is, the DRX function module cannot output the DRX parameter, then releasing the DRX parameter.

Embodiment 4

In the LTE cell, the intra-system ANR switch is turned on, the threshold of the A3-Enter event is set as −3 dB, and TANRinter is 1 s.

At this time, a certain UE code-named D reports the A3-Enter event, the UE selection module judges: the UE code-named D currently has NGBR bearer services in which QCI=9 and QCI=6, namely the UE only has the NGBR service; simultaneously, because the A3-Enter event is reported, it is explained that the UE is in the cell edge, and enters the CEU state; the UE currently does not trigger the switching process and etc., and is in the control plane steady state; simultaneously it shows that the UE has the Long DRX ability and the ANR measurement ability; therefore, this UE code-named D is selected as the UE specifically used for the ANR measurement, this UE is labelled as being selected by the intra-system ANR function, and is output to the DRX configuration module, specifically:

Step 41: judging that the UE code-named D is selected by the intra-system ANR function, and turning to step 42;

Step 42: obtaining the DRX parameter supporting the intra-system ANR, setting the DRX cycle as 320 ms, selecting the intra-system timer as the timer, TANR=TANRintra=1 s, and turning to step 43;

Step 43: configuring the DRX parameter by the RRC, simultaneously setting the state of the UE as being selected by an ANR, starting the timer TANR, and turning to step 44;

Step 44: when the timer TANR starts for 0.5 s, initiating establishment of a voice service in which QCI=1 by the UE, and judging that the DRX parameter must be removed; otherwise, the QoS of the UE may be influenced;

Step 45: performing a DRX procedure specifically for removing configuration on the UE;

Step 46: judging whether the UE is suitable for configuring the DRX parameter based on the service, not configuring the DRX parameter because the DRX switch of the cell is not turned on, and turning to step 47; and Step 47: when the UE is not suitable for configuring the DRX parameter based on the service, that is, the DRX function module cannot output the DRX parameter, releasing the DRX parameter.

Embodiment 5

In the LTE cell, the intra-system ANR switch is turned on, the threshold of the A3-Enter event is set as −3 dB, and TANRinter is 1 s.

At this time, a certain UE code-named E reports the A3-Enter event, the UE selection module judges: the UE code-named E currently has the NGBR bearer services in which QCI=9 and QCI=1, the service in which QCI=1 is a GBR service, and does not meet condition a), and thus cannot be selected by the ANR function.

Embodiment 6

In the LTE cell, the intra-system ANR switch is turned on, the threshold of the A3-Enter event is set as −3 dB, and TANRinter is 1 s.

At this time, a certain UE code-named F reports the A3-Enter event, the UE selection module judges: the UE code-named F currently has the NGBR bearer services in which QCI=9 and QCI=6, that is the UE only has the NGBR service; simultaneously, because the A3-Enter event is reported, it is explained that the UE is in the cell edge, and enters the CEU state; the UE currently does not trigger the switching process and etc., and is in the control plane steady state; simultaneously it shows that the UE has the Long DRX ability and the ANR measurement ability; therefore, this UE code-named F is selected as the UE specifically used for the ANR measurement, this UE is labelled as being selected by the intra-system ANR, and is output to the DRX configuration module, specifically:

Step 61: judging that the UE code-named F is selected by the intra-system ANR function, and turning to step 62;

Step 62: obtaining the DRX parameter supporting the intra-system ANR, setting the DRX cycle as 320 ms, selecting the intra-system timer as the timer, TANR=TANRintra=1 s, and turning to step 63;

Step 63: configuring the DRX parameter by the RRC, simultaneously setting the state of the UE as being selected by an ANR successfully, starting the timer TANR, and turning to step 64;

Step 64: when the timer TANR starts for 0.5 s, initiating establishment of the voice service in which QCI=1 by the UE, judging that the specific DRX parameter must be removed, otherwise, the QoS of the UE may be influenced, and turning to step 65;

Step 65: executing the DRX procedure specifically for removing configuration; and Step 66: judging whether the UE is suitable for configuring the DRX parameter based on the service, and requiring re-configuration of the DRX parameter because the DRX switch of the cell is turned on.

The ANR user equipment management apparatus, and the UE selection module and the DRX configuration module in the ANR user equipment management apparatus, and the judgment sub-module, the configuration sub-module, the state identifier setting sub-module, and the timer starting sub-module in the DRX configuration module, which are provided in the embodiment of the disclosure, can all be implemented by a processor in a base station, of course can also be implemented by a specific logic circuit; for example, in an actual application, the processor may be a Central Processing Unit (CPU), a Micro-Processor Unit (MPU), a Digital Signal Processor (DSP), a Field-Programmable Gate Array (FPGA), or etc.

All those described above are only preferred embodiments of the disclosure, and are not therefore used to limit the scope of patent protection of the disclosure. Any equivalent structure or equivalent process transition, which is made by employing content of the specification and the accompanied drawings of the disclosure, and is applied in other related technical fields directly or indirectly, shall similarly be included in the scope of the patent protection of the disclosure.

INDUSTRIAL APPLICABILITY

The embodiment of the disclosure selects the corresponding user equipment when the ANR function is enabled, and then configures the discontinuous reception configuration matching the ANR function for the user equipment; it can be seen that the embodiment of the disclosure can specifically configure the DRX parameter for the UE selected by the ANR function, thus influences the fewest UEs, and influences the UE in the least time, so that the success rate of the ANR measurement is improved without influencing the entire user's feeling of the cell, and simultaneously the KPI index is not influenced; further, the embodiment of the disclosure may also adjust the DRX parameter in time in accordance with the service of the UE, and the influence on the QoS of the UE executing the ANR function is reduced to the lowest extant.

What is claimed is:

1. An Automatic Neighbor Relation (ANR) task execution method, comprising:
    selecting a corresponding user equipment, when an ANR function is enabled;
    configuring a discontinuous reception configuration matching the ANR function for the user equipment; and
    executing a corresponding ANR task based on the discontinuous reception configuration;
        wherein the configuring the discontinuous reception configuration matching the ANR function for the user equipment comprises:
        when the ANR function is an intra-system ANR function, then configuring a DRX parameter supporting the intra-system ANR function for the user equipment;
        when the ANR function is an inter-system ANR function, then configuring the DRX parameter supporting the inter-system ANR function for the user equipment; and
        after the DRX parameter supporting the ANR function has been configured for the user equipment, starting a timer corresponding to the ANR task.

2. The ANR task execution method according to claim 1, wherein the configuring the discontinuous reception configuration matching the ANR function for the user equipment further comprises:
    after the DRX parameter supporting the ANR function has been configured for the user equipment, setting a state of the user equipment as being selected by the ANR function.

3. The ANR task execution method according to claim 1, wherein the executing the corresponding ANR task based on the discontinuous reception configuration comprises:
    judging whether execution of the ANR task is finished or the timer is overtime, when the execution is finished or the timer is overtime, then performing a discontinuous reception configuration removing operation on the user equipment.

4. The ANR task execution method according to claim 3, wherein the executing the corresponding ANR task based on the discontinuous reception configuration further comprises:
    judging whether the user equipment initiates a discontinuous reception configuration release request, when the user equipment initiates the discontinuous reception configuration release request, then performing a discontinuous reception configuration release operation on the user equipment; or judging whether the user equipment initiates a discontinuous reception configuration modifying request, when the user equipment initiates the discontinuous reception configuration modifying request, then judging whether the user equipment is suitable for configure the discontinuous reception configuration based on a service, when the user equipment is suitable, then re-configuring the discontinuous reception configuration for the user equipment, when the user equipment is not suitable, then releasing the discontinuous reception configuration.

5. The ANR task execution method according to claim 1, the selected user equipment includes:
    the user equipment currently only has a Non-Guaranteed Bit Rate, NGBR service;
    a current state of the user equipment is a Cell Edge User, CEU state, that is the user equipment triggers an A3-Enter event, wherein the A3-Enter event shares a A3 measurement control with measurement determined by a centre area/edge area of an Inter-Cell Interference Coordination, ICIC technique;
    the user equipment is in a control plane steady state currently; and
    the user equipment has a Long DRX ability and an ANR measurement ability.

6. An Automatic Neighbor Relation (ANR) user equipment management method, comprising:
    selecting a corresponding user equipment when an ANR function is enabled; and
    configuring a discontinuous reception configuration matching the ANR function for the user equipment;
        wherein the configuring the discontinuous reception configuration matching the ANR function for the user equipment comprises:
        when the ANR function is an intra-system ANR function, then configuring a DRX parameter supporting the intra-system ANR function for the user equipment;
        when the ANR function is an inter-system ANR function, then configuring the DRX parameter supporting the inter-system ANR function for the user equipment; and
        after the DRX parameter supporting the ANR function has been configured for the user equipment, a timer corresponding to the ANR task.

7. The ANR user equipment management method according to claim 6, wherein the configuring the discontinuous reception configuration matching the ANR function for the user equipment further comprises:
    after the DRX parameter supporting the ANR function has been configured for the user equipment, setting a state of the user equipment as being selected by the ANR function.

8. The ANR user equipment management method according to claim 6, further comprising: after the configuring the discontinuous reception configuration matching the ANR function for the user equipment,
    judging whether execution of the ANR task is finished or the timer is overtime, when the execution is finished or the timer is overtime, then performing a discontinuous reception configuration removing operation on the user equipment.

9. An Automatic Neighbor Relation (ANR) user equipment management apparatus, comprising:
    a user equipment selection module, configured to select a corresponding user equipment when an ANR function is enabled; and
    a discontinuous reception configuration module, configured to configure discontinuous reception configuration matching the ANR function for the user equipment selected by the user equipment selection module;

wherein the discontinuous reception configuration module comprises a judgment sub-module, a configuration sub-module and a timer starting sub-module, wherein the judgment sub-module is configured to judge whether the ANR function is an intra-system ANR function or an inter-system ANR function, and to send a judgment result to the configuration sub-module;

the configuration sub-module is configured to configure a DRX parameter supporting the intra-system ANR function for the user equipment when the judgment result is the intra-system ANR function; and to configure the DRX parameter supporting the inter-system ANR function for the user equipment when the judgment result is the inter-system ANR function; and the timer starting sub-module is configured to start a timer corresponding to the ANR task, after the configuration sub-module has configured the DRX parameter supporting the ANR function for the user equipment.

10. An Automatic Neighbor Relation (ANR) task execution system, comprising an ANR user equipment management apparatus, and at least one user equipment; wherein the ANR user equipment management apparatus comprises a user equipment selection module and a discontinuous reception configuration module; wherein the user equipment selection module is configured to select a corresponding user equipment from at least one user equipment when an ANR function is enabled;

the discontinuous reception configuration module is configured to configure discontinuous reception configuration matching the ANR function for the user equipment selected by the user equipment selection module; and the user equipment selected by the user equipment selection module is configured to execute a corresponding ANR task based on the discontinuous reception configuration;

wherein the discontinuous reception configuration module comprises a judgment sub-module, a configuration sub-module and a timer starting sub-module, wherein the judgment sub-module is configured to judge whether the ANR function is an intra-system ANR function or an inter-system ANR function, and to send a judgment result to the configuration sub-module;

the configuration sub-module is configured to configure a DRX parameter supporting the intra-system ANR function for the user equipment when the judgment result is the intra-system ANR function; and to configure the DRX parameter supporting the inter-system ANR function for the user equipment when the judgment result is the inter-system ANR function; and the timer starting sub-module is configured to start a timer corresponding to the ANR task, after the configuration sub-module has configured the DRX parameter supporting the ANR function for the user equipment.

* * * * *